Sept. 25, 1962 C. L. VOGT 3,055,217
COMBINED TOOL AND CONTAINER
Filed Aug. 17, 1959
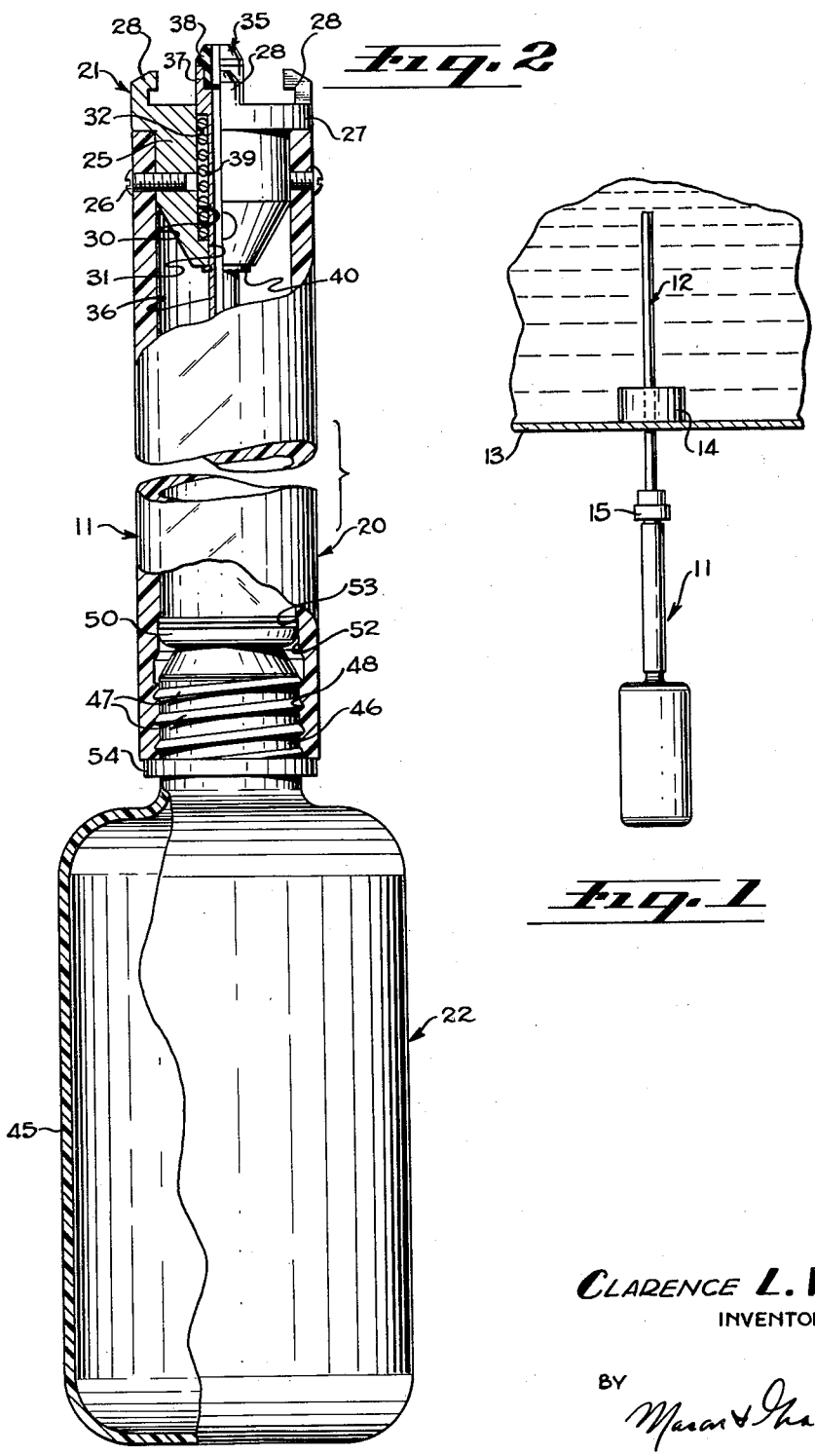
CLARENCE L. VOGT.
INVENTOR.
BY Mason & Graham
ATTORNEYS 3,055,217
COMBINED TOOL AND CONTAINER
Clarence L. Vogt, Burbank, Calif., assignor to Airaterra, Glendale, Calif., a corporation of California
Filed Aug. 17, 1959, Ser. No. 834,287
1 Claim. (Cl. 73—298)

This invention has to do with a device in the nature of a tool or implement having a container portion for receiving liquid from a fitting or the like.

The invention is particularly designed for use in operating a gauge tube of the type disclosed in the pending application for patent of James H. Field and Clarence L. Vogt, for Slip-Tube Gauge, Serial No. 607,620, filed September 4, 1956. The gauge disclosed in said application comprises generally a tube which is mounted in the lower wall of a tank and extends upwardly into the tank, being so mounted that it can be withdrawn axially. Thus, when the tube is withdrawn to the point where the inner end thereof is approximately even with or very slightly below the level of liquid in the tank, the liquid will seep through the tube, which is open-ended. Since such gauges are ordinarily used primarily in the wing fuel tanks of aircraft, any spillage of fuel creates a fire hazard and should be avoided.

An object of the invention is to provide a novel device for use in operating such a gauge as described without permitting escape of liquid from the tank to the atmosphere.

A further object is to provide a simple device of the nature indicated which is economical to manufacture and can be readily operated.

More particularly it is an object to provide such a device which has a tool portion for engaging the gauge tube to enable the unlocking and withdrawal thereof, a tubular body portion being in part at least transparent to enable the operator to observe liquid passing therethrough, and a container portion for receiving the liquid.

A still further object is to provide a device of the type indicated in which the container can be readily removed for the purpose of emptying and cleaning the same, and to provide a device in which the tool portion accommodates adapters useful for operating devices other than the primary device for which the tool is designed.

These and other objects will be apparent from the drawing and the following description:

FIG. 1 is a diagrammatic sectional elevational view showing a device embodying the invention associated with a gauge tube in a tank to illustrate the use of the device; and FIG. 2 is a sectional elevational view of a device embodying the invention.

More particularly describing the invention, referring first to FIG. 1, 11 generally designates a device embodying the invention shown operatively associated with a gauge tube 12 shown mounted in a fuel tank 13 which may be in the wing of an airplane. The gauge tube 12 is axially slidable in a mounting 14 so that it may be withdrawn through the mounting for the purpose of gauging the level of liquid in the tank. By withdrawing the tube until liquid seeps or flows therethrough, the height of the liquid level is readily ascertained. When not being used the tube 12 is completely housed within tank 13 and a fitting 15 at the outer end of the tube is provided to cooperate with mounting 14 for releasably locking the tube in retracted position. The device of the present invention is in the nature of a tool for operating the tube 12 and for catching the fuel which flows through the gauge tube to prevent spillage of the fuel.

The device 11 includes in general, a tube 20, a fitting 21 at one end of the tube, and a container 22 at the other end. The tube 20 is preferably transparent, although it need only be so for a portion of its length, so as to enable the user to observe liquid flowing therethrough. Preferably the tube is made of a plastic, Plexiglas being particularly suitable.

A fitting 21 is mounted at one end of the tube. This includes a body portion 25 which is received within the outer end portion of the tube and is detachably secured in place by screws 26. The body is formed at its outer end to provide an enlarged portion 27 which has four axially projecting fingers 28 shaped to cooperate with the particular type of gauge tube fitting 15 for the purpose of releasably engaging the same and thereby enabling an operator to unlock the tube and withdraw it. Also, an adapter (not shown) can be coupled to the fitting 21 to enable the tool to be used in conjunction with other apparatus.

The body 25 is provided with a central opening 30 therethrough, which includes a bore 31 and a counterbore 32. A tubular center member 35 is mounted for limited axial movement in the opening 30. The member includes a cylindrical metal shank 36 and a radially enlarged cupped end portion 37 in which is mounted a resilient seal member 38. A spring 39 serves to resiliently urge the member 35 outwardly, a snap ring 40 being used to retain the parts.

It will be apparent that the means 21 provides a tool portion at one end of the tube 20 for engagement with a gauge tube or the like, the inner movable center member 35 being adapted sealingly to engage the gauge tube for the purpose of conveying liquid passing therethrough into tube 20 and then into container 22.

The container 22 may be of bottle-like shape as shown, having a main body 45 and a neck 46. It may be made of a plastic material, such as polyethylene for example. the neck 46 is provided with screw threads 47 adapted to engage the internal threaded area 48 of the end of the tube.

The end of the plastic bottle has an integral seal form portion 50 which engages with a counterbore 52 and shoulder 53 in the end of tube 20 to prevent any leakage of fluid between the bottle and the tube. A flange 54 on the neck limits entry of the neck of the bottle into the tube.

It will be apparent that the device shown and described can be readily used in the manner and for the purpose hereinabove set forth. It will also be apparent that various changes and modifications can be made in the device without departing from the invention the scope of which is indicated by the claim which follows.

I claim:

A device for operating a withdrawable gauge tube mounted in the bottom wall of a tank and having a fitting at its lower end, comprising a straight, rigid, open-ended transparent tube formed of a plastic, a metal fitting mounted in one end of said tube and projecting therebeyond for coupling engagement with the fitting at the lower end of the gauge tube, said metal fitting having a central opening therethrough, an inner tube mounted in said opening for limited axial movement and projecting outwardly beyond said fitting, spring means yieldably urging said inner tube outwardly of said fitting, a resilient seat at the outer end of said inner tube for sealing engagement with the gauge tube, a container having a neck portion received in the other end of said transparent tube, and interengaging means on the neck of said container and within said other end of said transparent tube for detachabily securing the container to the tube.

References Cited in the file of this patent

UNITED STATES PATENTS

| | | |
|---|---|---|
| 165,415 | Henderson | July 13, 1875 |
| 705,103 | Levick | July 22, 1902 |
| 728,426 | Timar | May 19, 1903 |
| 768,440 | Fenn | Aug. 23, 1904 |
| 1,979,705 | Raymond | Nov. 6, 1934 |